(12) United States Patent
Prohaszka

(10) Patent No.: US 10,869,117 B2
(45) Date of Patent: Dec. 15, 2020

(54) HEADSET EARCUP ADAPTER

(71) Applicant: Television Equipment Associates, Inc, Brewster, NY (US)

(72) Inventor: Gustavo Prohaszka, Brewster, NY (US)

(73) Assignee: Television Equipment Associates, Inc., Brewster, NY (US)

( * ) Notice: Subject to any disclaimer, the term of this patent is extended or adjusted under 35 U.S.C. 154(b) by 615 days.

(21) Appl. No.: 15/785,293

(22) Filed: Oct. 16, 2017

(65) Prior Publication Data

US 2018/0115817 A1 Apr. 26, 2018

Related U.S. Application Data

(60) Provisional application No. 62/410,445, filed on Oct. 20, 2016.

(51) Int. Cl.
*H04R 1/10* (2006.01)
*F16C 11/10* (2006.01)

(52) U.S. Cl.
CPC ............ *H04R 1/1066* (2013.01); *F16C 11/10* (2013.01); *H04R 1/105* (2013.01)

(58) Field of Classification Search
CPC ........ H04R 1/10; H04R 1/105; H04R 1/1066; H04R 1/1016; H04R 1/1008; H04R 5/033; H04R 5/0335; Y10T 403/7041; F16B 2/065; F16B 35/005; A61F 11/14
See application file for complete search history.

(56) References Cited

U.S. PATENT DOCUMENTS

| | | | | |
|---|---|---|---|---|
| 2,754,519 A | * | 7/1956 | Kindel | A61F 11/14 2/209 |
| 2,801,423 A | * | 8/1957 | Shaw | A61F 11/14 2/209 |
| 3,030,131 A | * | 4/1962 | Scherry | G05G 1/12 403/362 |
| 3,505,684 A | | 4/1970 | Hutchinson et al. | |
| 3,579,640 A | * | 5/1971 | Beguin et al. | A61F 11/14 2/209 |
| 3,833,939 A | * | 9/1974 | Dostourian | H04R 1/1066 2/209 |
| 4,040,757 A | * | 8/1977 | Pauli | F16B 21/10 403/356 |

(Continued)

*Primary Examiner* — Jonathan P Masinick
(74) *Attorney, Agent, or Firm* — Asgaard Patent Services, LLC; F. Wayne Thompson, Jr.

(57) ABSTRACT

An example headset earcup adapter comprises: a housing that includes a clamp configured to secure about a stud of an earcup, a longitudinally extending bore configured to receive an arm of a headset wire form therein, an opening that extends through to the longitudinally extending bore, and a first protrusion and a second protrusion positioned above and below, respectively, an external entrance of the opening; a threaded insert positioned within the opening in the housing; and an adjustment screw threadedly received by the threaded insert that is long enough to extend through the threaded insert and into the longitudinally extending bore of the housing to make contact with an arm of a headset wire form positioned therein. The first protrusion and the second protrusion of the housing define an opening therebetween configured to receive the head portion of the adjustment screw therein.

10 Claims, 4 Drawing Sheets

(56) References Cited

U.S. PATENT DOCUMENTS

| | | | | |
|---|---|---|---|---|
| 4,747,145 | A | | 5/1988 | Wiegel |
| 4,783,822 | A | * | 11/1988 | Toole ................ H04M 1/05 |
| | | | | 2/209 |
| 5,125,032 | A | * | 6/1992 | Meister .............. A61F 11/14 |
| | | | | 381/151 |
| 5,213,001 | A | * | 5/1993 | Gruettner ........... F16H 57/0025 |
| | | | | 403/356 |
| 5,384,857 | A | | 1/1995 | Nordin |
| 6,333,982 | B1 | * | 12/2001 | Sapiejewski ........... H04M 1/05 |
| | | | | 379/430 |
| 6,611,963 | B2 | * | 9/2003 | Woo .................... A61F 11/14 |
| | | | | 2/209 |
| 6,965,681 | B2 | * | 11/2005 | Almqvist ............ H04R 1/1041 |
| | | | | 381/371 |
| 8,050,444 | B2 | | 11/2011 | Smith |
| 9,414,965 | B2 | * | 8/2016 | Roos .................... A61F 11/14 |
| D848,396 | S | * | 5/2019 | Wilson .................... D14/205 |
| 10,341,760 | B2 | * | 7/2019 | Mann ................ H04R 1/1041 |
| 10,477,297 | B2 | * | 11/2019 | Tsai .................. H04R 1/1066 |
| 10,639,201 | B2 | * | 5/2020 | Hakansson ......... H04R 1/1058 |
| 2005/0226432 | A1 | * | 10/2005 | Lee ..................... A61F 11/14 |
| | | | | 381/71.6 |
| 2008/0175406 | A1 | | 7/2008 | Smith |
| 2016/0015566 | A1 | * | 1/2016 | Vollet .................. A61F 11/14 |
| | | | | 2/431 |
| 2016/0029137 | A1 | * | 1/2016 | Price .................. H04R 1/2823 |
| | | | | 29/594 |
| 2018/0014973 | A1 | * | 1/2018 | Echeverri ........... H04R 1/1008 |
| 2019/0208308 | A1 | * | 7/2019 | Tews .................. H04R 1/1058 |

* cited by examiner

HEADSET EARCUP ADAPTER

CROSS REFERENCE TO RELATED APPLICATION

This application claims the benefit of U.S. Patent Application Ser. No. 62/410,445, which was filed on Oct. 20, 2016, and is incorporated herein by reference in its entirety.

TECHNICAL FIELD

This disclosure relates to implementations of a headset earcup adapter.

BACKGROUND

Headsets are routinely used to protect a wearers hearing and to facilitate hands-free communication. In general, headsets are used in conjunction with a headband or protective headgear such as a helmet. As a result, various attachments have been developed to secure the earcups of a headset to a wire form (or frame) of a headband or helmet mount. Often, these attachments are configured to accommodate individual variations in head shape so that the earcups of a headset may be comfortably positioned over the ears of a wearer.

U.S. Pat. No. 5,384,857 ("'857 patent") discloses a snap-in attachment for hearing-protection cups. The '857 patent discloses that each end section of a frame is slidably fitted in a socket that is part of a snap-in attachment.

However, the snap-in attachment disclosed in the '857 patent has at least two disadvantages. First, no means to adjust the tension securing the socket on the end section of a frame is provided. Over time, the fit between the two components can degrade causing the socket to lose its ability to maintain a selected position on the end section of a frame. Second, the sockets are prone to breaking during use due to their thin tubular construction.

Accordingly, it can be seen that needs exist for the headset earcup adapter disclosed herein. It is to the provision of a headset earcup adapter configured to address these needs, and others, that the present invention is primarily directed.

SUMMARY OF THE INVENTION

Implementations of a headset earcup adapter are provided. In some implementations, a pair of headset earcup adapters may be used to secure an earcup to a wire form of a headset.

In some implementations, an example headset may comprise a headband having a wire form secured to each side. In some implementations, each wire form may comprise a first arm and a second arm that extend from a bend therein. In some implementations, the distal end of the first arm and the second arm of the wire form has a first headset earcup adapter and a second headset earcup adapter, respectively, secured thereon. In this way, an earcup may be secured to the wire form by the pair of headset earcup adapters. In some implementations, once the earcup has been secured to a wire form by a pair of headset earcup adapters, the earcup may be pivotable in relation to the headband of the headset.

An example headset earcup adapter comprises: a housing, the housing comprises a clamp positioned on a bottom end of the housing configured to secure about a stud of an earcup, a longitudinally extending bore that extends from a top end of the housing configured to receive an arm of a headset wire form therein, an opening that extends through to the longitudinally extending bore, and a first protrusion and a second protrusion positioned above and below, respectively, an external entrance of the opening; a threaded insert positioned within the opening in the housing; and an adjustment screw having a head portion and a threaded body portion, the adjustment screw is configured to be threadedly received by the threaded insert and is long enough to extend through the threaded insert and into the longitudinally extending bore of the housing to thereby make contact with an arm of a headset wire form positioned therein. The first protrusion and the second protrusion of the housing define an opening therebetween configured to receive the head portion of the adjustment screw therein.

In some implementations, an earcup having a pair of headset earcup adapters secured thereto may be transitioned between the wire form of a helmet mount and the wire form of a headband.

DETAILED DESCRIPTION

Figure 1:
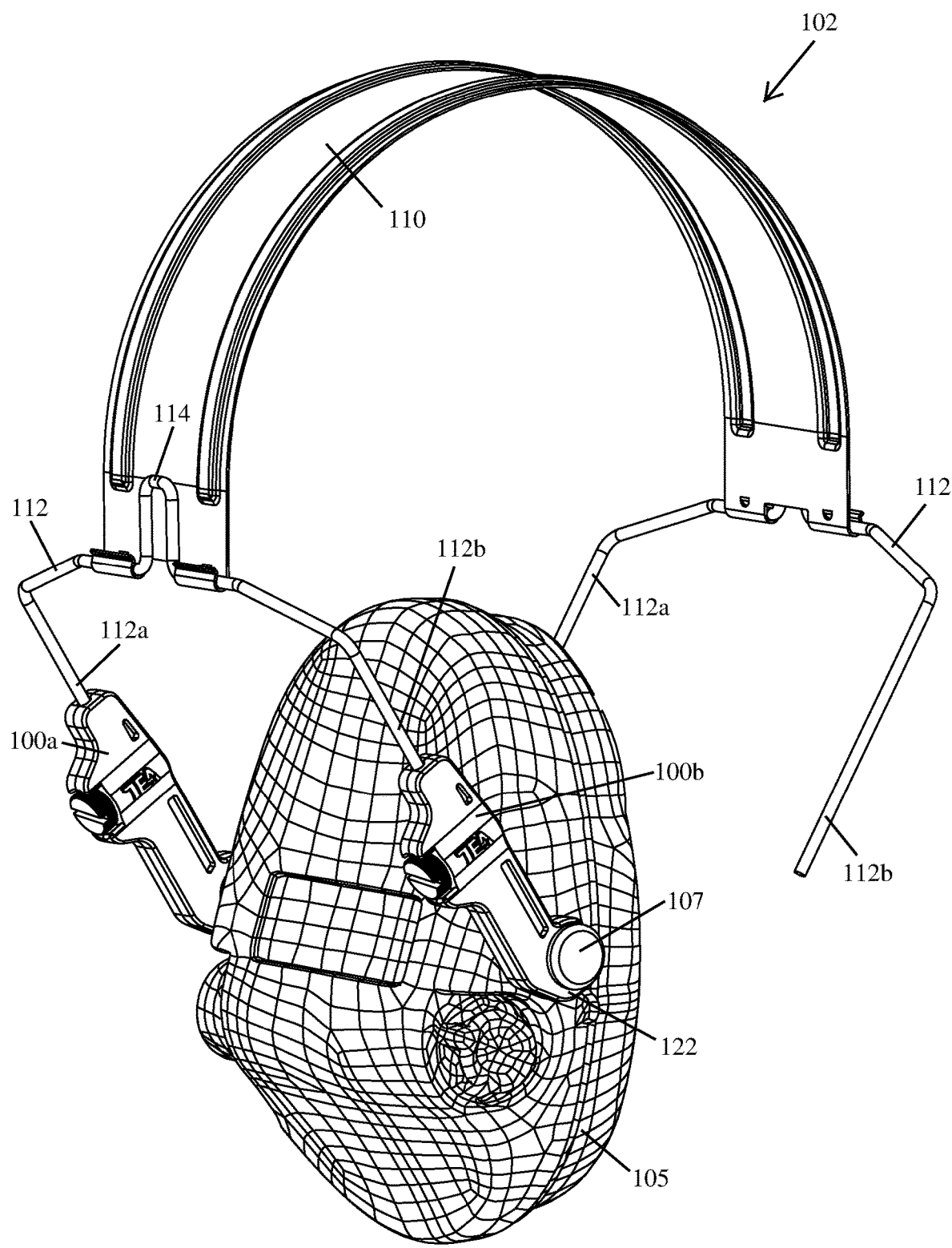
FIG. 1 illustrates a perspective view of an example headset having a pair of headset earcup adapters secured to the wire form thereof according to the principles of the present disclosure.

FIGS. 2A-4 illustrate an example implementation of a headset earcup adapter 100 according to the principles of the present disclosure. In some implementations, a pair of headset earcup adapters (100a, 100b) may be used to secure an earcup 105 to the wire form 112 of a headset 102 (see, e.g., FIG. 1).

As shown in FIG. 1, in some implementations, the example headset 102 may comprise a headband 110 having a wire form 112 secured to each side. In some implementations, each wire form 112 may comprise a first arm 112a and a second arm 112b that extend from a bend 114 therein. In some implementations, the distal end of the first arm 112a and the second arm 112b has a first headset earcup adapter 100a and a second headset earcup adapter 100b, respectively, secured thereon. In this way, an earcup 105 may be secured to the wire form 112 by the pair of headset earcup adapters 100a, 100b.

Figure 2A:
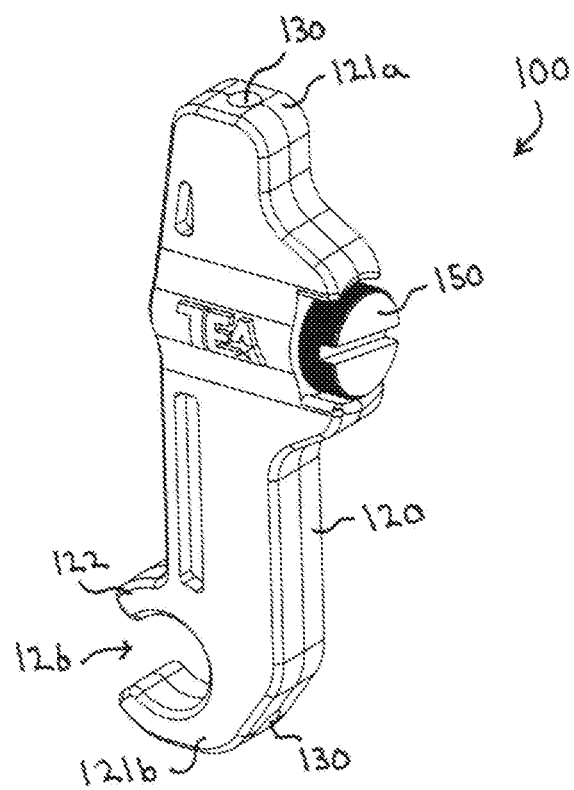
FIGS. 2A and 2B illustrate a headset earcup adapter according to the principles of the present disclosure.
Figure 2B:
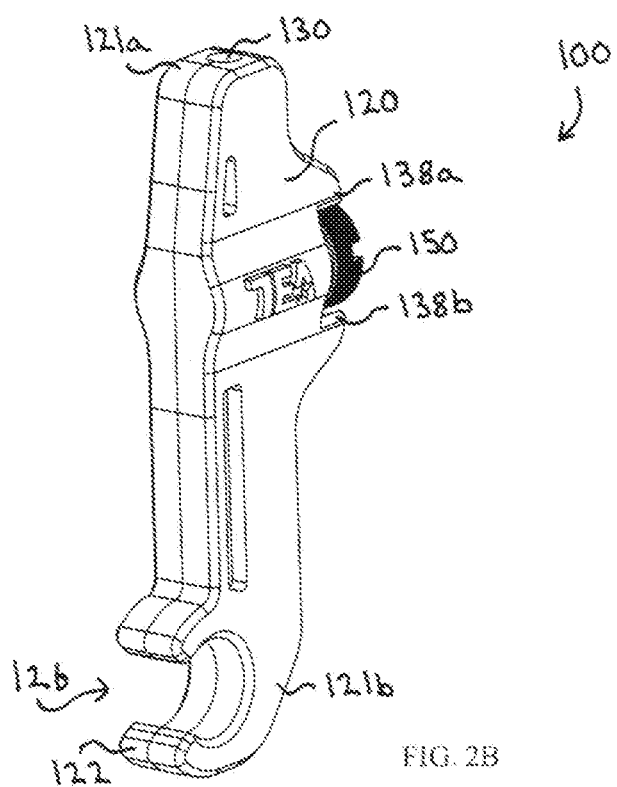
Figure 3:
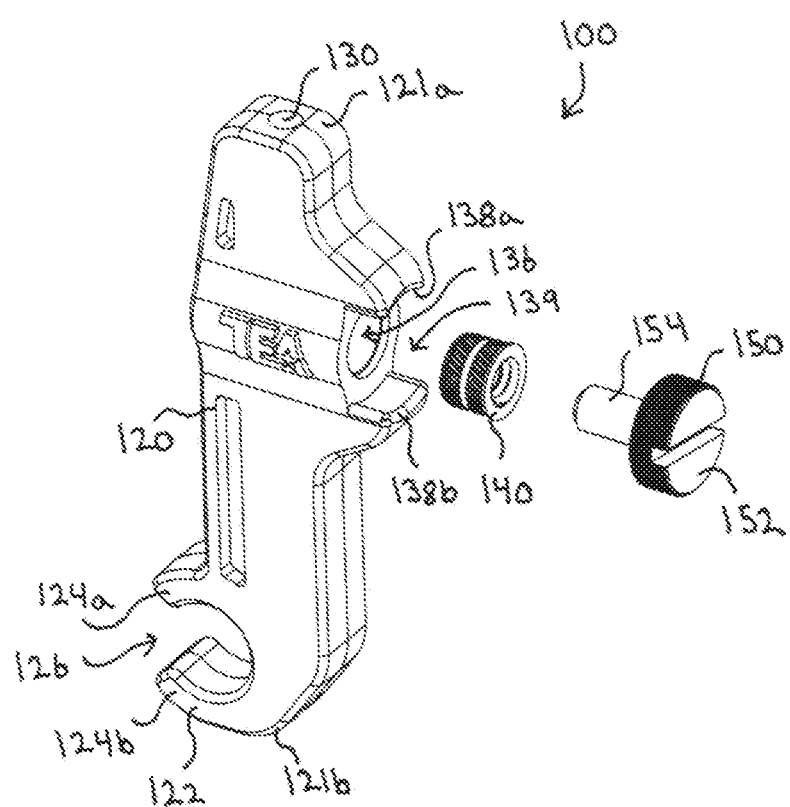
FIG. 3 illustrates an exploded view of the headset earcup adapter shown in FIGS. 2A and 2B.

As shown in FIGS. 2A, 2B, and 3, in some implementations, a headset earcup adapter 100 may comprise a housing 120, a threaded insert 140, and an adjustment screw 150.

Figure 4:
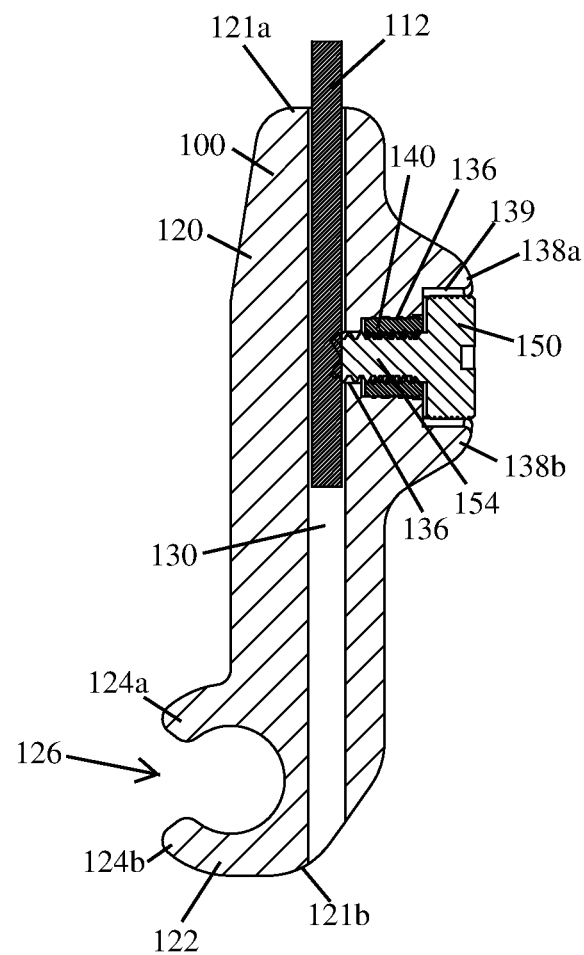
FIG. 4 illustrates a side cutaway view of the headset earcup adapter shown in FIGS. 2A and 2B wherein an arm of a wire form 112 is positioned within the longitudinally extending bore 130 thereof.

As shown in FIGS. 3 and 4, in some implementations, the housing 120 may include a C-shaped clamp 122, a longitudinally extending bore 130, and an opening 136 configured to receive and secure the threaded insert 140 therein.

As shown in FIGS. 2A, 2B, and 3, in some implementations, the C-shaped clamp 122 may be positioned on a second end 121b of the housing 120. In some implementations, the C-shaped clamp 122 is configured to be removably attached to a stud 107 extending from a side of an earcup 105 (see, e.g., FIG. 1). While not shown, an equivalent of the stud 107 shown in FIG. 1 is found on the opposite side of the earcup 105. In some implementations, the clamp 122 may be any shape suitable for being removably attached to a stud 107 of an earcup 105.

As shown in FIG. 3, in some implementations, the C-shaped clamp 122 may comprise a first jaw 124a and a second jaw 124b (collectively jaws 124). In some implementations, the second jaw 124b may be on the bottom of the second end 121b of the housing 120 and the first jaw 124a may be spaced from the second jaw 124b thereby forming a gap 126. In some implementations, the width of the gap 126 formed between the jaws 124 may be less than the width of an earcup 105 stud 107. In some implementations, the gap 126 between the jaws 124 expands towards a cavity configured to receive and/or retain a stud 107 of an earcup 105 therein. In some implementations, the jaws 124 may be manufactured from a resilient material. In this way, the jaws 124 are able to resiliently deform when being attached to and/or removed from a stud 107 of an earcup 105.

As shown in FIG. 4, in some implementations, the longitudinally extending bore 130 may extend between a first end 121a and the second end 121b of the housing 120. In some implementations, the longitudinally extending bore 130 is located within the interior of the housing 120 (see, e.g., FIG. 4). In some implementations, the bore 103 is a cylindrical opening configured to receive an arm (112a, 112b) of a wire form 112 therein. In this way, an arm (112a, 112b) of the wire form 112 may be slidably received within the housing 120 of a headset earcup adapter 100.

As shown in FIGS. 3 and 4, in some implementations, the opening 136 configured to receive and secure the threaded insert 140 therein is positioned between the first end 121a and the second end 121b of the housing 120. In some implementations, the opening 136 extends from the longitudinally extending bore 130 and is perpendicular thereto (see, e.g., FIG. 4).

In some implementations, the threaded insert 140 may be molded into the opening 136 of the housing 120. In some implementations, the threaded insert 140 may be configured to threadedly receive an adjustment screw 150 therein and allow a portion of the adjustment screw 150 to pass therethrough (see, e.g., FIG. 4). In some implementations, the threaded insert 140 may be manufactured from an aluminum alloy, a steel alloy, and/or other material suitable for being molded into the opening 136 of the housing 120 and threadedly receiving an adjustment screw 150 therein.

As shown in FIGS. 3 and 4, in some implementations, the adjustment screw 150 may comprise a head portion 152 and a threaded body portion 154. In some implementations, the body portion 154 of the adjustment screw 150 is long enough to extend through the threaded insert 140 and into the longitudinally extending bore 130 of the housing 120 to thereby make contact with the arm (112a, 112b) of a wire form 112 positioned therein (see, e.g., FIG. 4). In this way, the adjustment screw 150 may be used to adjustably position and secure a headset earcup adapter 100 on an arm (112a, 112b) of the wire form 112.

As shown in FIGS. 3 and 4, in some implementations, the housing 120 may include a first protrusion 138a and a second protrusion 138b positioned above and below, respectively, the entrance of the opening 136 for the threaded insert 140. In some implementations, the first protrusion 138a and the second protraction 138b may define an opening 139 therebetween that is larger in diameter than the opening 136 for the threaded insert 140. In some implementations, each protrusion (138a, 138b) includes a curved interior wall configured to contour about the head portion 152 of the adjustment screw 150 without making contact therewith (see, e.g., FIGS. 3 and 4). In some implementations, the head portion 152 of the adjustment screw 150 may be partially enveloped and shielded from inadvertent contact by the first protrusion 138a and the second protrusion 138b of the housing 120 (see, e.g., FIG. 2A).

To secure an earcup 105 to a headset 102 having a wire form 112 using a pair of earcup adapters (100a, 100b) constructed in accordance with the present disclosure, in some implementations, the following steps may be used:

First, in some implementations, loosen the adjustment screw 150 of a first headset earcup adapter 100a so that the body portion 154 thereof is not extending into the longitudinally extending bore 130 of the housing 120. Then, insert a first arm 112a of a wire form 112 into the opening of the longitudinally extending bore 120 located in the first end 121a of the housing 120 (see, e.g., FIGS. 1 and 4). Next, orient the housing 120 of the earcup adapter 100a so that the opening into the gap 126 of the C-shaped clamp 122 is facing towards the interior of the headband 110 (see, e.g., FIG. 1). Then, position the first arm 112a of the wire form 112 within the bore 130 so that the tip of the adjustment screw 150 may make contact therewith when tightened (see, e.g., FIG. 4). Next, tighten the adjustment screw 150 until the distal end of the body portion 154 thereof makes contact with the first arm 112a of the wire form 112.

Then, in some implementations, loosen the adjustment screw 150 of a second headset earcup adapter 100b so that the body portion 154 thereof is not extending into the longitudinally extending bore 130 of the housing 120. Next, insert a second arm 112b of a wire form 112 into the opening of the bore 120 located in the first end 121a of the housing 120 (see, e.g., FIG. 1). Then, orient the housing 120 of the earcup adapter 100b so that the opening into the gap 126 of the C-shaped clamp 122 is facing towards the interior of the headband 110 (see, e.g., FIG. 1). Next, position the second arm 112b of the wire form 112 within the bore 130 so that the tip of the adjustment screw 150 may make contact therewith when tightened and so that the second earcup adapter 100b is the same distance from the headband 110 of the headset 102 as the first earcup adapter 100a (see, e.g., FIGS. 1 and 4). Then, tighten the adjustment screw 150 until the distal end of the body portion 154 thereof makes contact with the second arm 112b of the wire form 112.

Next, as shown in FIG. 1, position an earcup 105 between the first and second earcup adapters (100a, 100b) so that it will fit over an ear of a user when the headband 110 is donned. Then, snap the stud 107 positioned on the first side and the second side of the earcup 105 into the C-shaped clamp 122 of each earcup adapter 100a, 100b (see, e.g., FIG. 1).

In some implementations, once the earcup 105 has been secured to the wire form 112 by the headset earcup adapters 100a, 100b, the earcup 105 may be pivotable in relation to the headband 110.

In some implementations, the above steps may be used to secure a second earcup 105 to the second wire form 112 of the headset 102 using a pair of earcup adapters 100 constructed in accordance with the present disclosure. In this way, the headset 102 may have two earcups 105 secured thereto.

In some implementations, the positioning of each earcup 105 and thereby the overall fit of the headset 102 may be adjusted using the follow steps:

Initially, loosen the adjustment screw 150 of each earcup adapter (e.g., 100a, 100b) secured to the first wire form 112 of the headset 102. Then, reposition the earcup 105 on the arms (112a, 112b) of the wire form 112 to a desired position. Next, tighten the adjustment screw 150 of each headset earcup adapter (100a, 100b).

In some implementations, an earcup 105 having a pair of headset earcup adapters (100a, 100b) secured thereto may be transitioned between the wire form 112 of a helmet mount and the wire form 112 of a headband.

It should be understood that the present invention, a headset earcup adapter 100, is not limited to use with the earcup 105 shown in FIG. 1. Rather, some implementations of the headset earcup adapter 100 disclosed herein may be configured to secure any earcup having a stud extending from two sides thereof to a wire form.

Reference throughout this specification to "an embodiment" or "implementation" or words of similar import means that a particular described feature, structure, or characteristic is included in at least one embodiment of the present invention. Thus, the phrase "in some implementations" or a phrase of similar import in various places throughout this specification does not necessarily refer to the same embodiment.

Many modifications and other embodiments of the inventions set forth herein will come to mind to one skilled in the art to which these inventions pertain having the benefit of the teachings presented in the foregoing descriptions and the associated drawings.

The described features, structures, or characteristics may be combined in any suitable manner in one or more embodiments. In the above description, numerous specific details are provided for a thorough understanding of embodiments of the invention. One skilled in the relevant art will recognize, however, that embodiments of the invention can be practiced without one or more of the specific details, or with other methods, components, materials, etc. In other instances, well-known structures, materials, or operations may not be shown or described in detail.

While operations are depicted in the drawings in a particular order, this should not be understood as requiring that such operations be performed in the particular order shown, or in sequential order, or that all illustrated operations be performed, to achieve desirable results.

The invention claimed is:

1. A headset earcup adapter comprising:
   a housing, the housing comprises a clamp positioned on a bottom end of the housing configured to secure about a stud of an earcup, longitudinally extending bore that extends from a top end of the housing configured to receive an arm of a headset wire form therein, an opening that extends through to the longitudinally extending bore, and a first protrusion and a second protrusion positioned above and below, respectively, an external entrance of the opening;
   a threaded insert positioned within the opening in the housing; and
   an adjustment screw having a head portion and a threaded body portion, the adjustment screw is configured to be threadedly received by the threaded insert and is long enough to extend through the threaded insert and into the longitudinally extending bore of the housing to thereby make contact with an arm of a headset wire form positioned therein;
   wherein the first protrusion and the second protrusion of the housing define an opening therebetween configured to receive the head portion of the adjustment screw therein.

2. The headset earcup adapter of claim 1, wherein the clamp is C-shaped, the C-shaped clamp comprises a first jaw and a second jaw that define a gap therebetween, the first jaw and the second jaw are configured to resiliently deform when being secured about a stud of an earcup.

3. The headset earcup adapter of claim 2, wherein the first protrusion and the second protrusion each include a curved interior wall configured to contour about the head portion of the adjustment screw without making contact therewith.

4. The headset earcup adapter of claim 3, wherein the opening between the first protrusion and the second protrusion is larger in diameter than the opening in which the threaded insert is positioned.

5. The headset earcup adapter of claim 2, wherein the longitudinally extending bore is a cylindrical opening.

6. The headset earcup adapter of claim 1, wherein the first protrusion and the second protrusion each include a curved interior wall configured to contour about the head portion of the adjustment screw without making contact therewith.

7. The headset earcup adapter of claim 6, wherein the opening between the first protrusion and the second protrusion is larger in diameter than the opening in which the threaded insert is positioned.

8. The headset earcup adapter of claim 7, wherein the clamp is C-shaped, the C-shaped clamp comprises a first jaw and a second jaw that define a gap therebetween, the first jaw and the second jaw are configured to resiliently deform when being secured about a stud of an earcup.

9. The headset earcup adapter of claim 1, wherein the longitudinally extending bore is a cylindrical opening.

10. A method of securing an earcup to a wire form of a headset, the method comprising:
    providing a first headset earcup adapter and a second headset earcup adapter, each headset earcup adapter comprises: a housing, the housing comprises a clamp positioned on a bottom end of the housing configured to secure about a stud of the earcup, a longitudinally extending bore that extends from a top end of the housing configured to receive an arm of the wire form therein, an opening that extends through to the longitudinally extending bore, and a first protrusion and a second protrusion positioned above and below, respectively, an external entrance of the opening; a threaded insert positioned within the opening in the housing; and an adjustment screw having a head portion and a threaded body portion, the adjustment screw is configured to be threadedly received by the threaded insert and is long enough to extend through the threaded insert and into the longitudinally extending bore of the housing to thereby make contact with the arm of the wire form positioned therein; wherein the first protrusion and the second protrusion of the housing define an opening therebetween configured to receive the head portion of the adjustment screw therein; and
    loosening the adjustment screw of the first headset earcup adapter so that the body portion thereof is not extending into the longitudinally extending bore of the housing;
    inserting a first arm of the wire form into the longitudinally extending bore of the first headset earcup adapter;
    orienting the housing of the first headset earcup adapter so that an opening of the clamp is facing towards an interior of the headset;
    positioning the first arm of the wire form within the longitudinally extending bore of the first headset earcup adapter so that a tip of the adjustment screw can make contact therewith when tightened;
    tightening the adjustment screw of the first headset earcup adapter until the tip thereof makes contact with the first arm of the wire form; and loosening the adjustment screw of the second headset earcup adapter so that the body portion thereof is not extending into the longitudinally extending bore of the housing;

inserting a second arm of the wire form into the longitudinally extending bore of the second headset earcup adapter;

orienting the housing of the second headset earcup adapter so that an opening of the clamp is facing towards an interior of the headset;

positioning the second arm of the wire form within the longitudinally extending bore of the second headset earcup adapter so that a tip of the adjustment screw can make contact therewith when tightened;

tightening the adjustment screw of the second headset earcup adapter until the tip thereof makes contact with the second arm of the wire form;

positioning the earcup between the first headset earcup adapter and the second headset earcup adapter;

securing the clamp of the first headset earcup adapter to a stud located on a first side of the earcup and the clamp of the second headset earcup adapter to a stud located on a second side of the earcup.

* * * * *